United States Patent
Fujiwara et al.

(10) Patent No.: US 12,316,958 B2
(45) Date of Patent: May 27, 2025

(54) IMAGING DEVICE, IMAGING METHOD, AND PROGRAM

(71) Applicant: FUJIFILM Corporation, Tokyo (JP)

(72) Inventors: Shinya Fujiwara, Saitama (JP); Taro Saito, Saitama (JP); Tomoharu Shimada, Saitama (JP); Takehiro Koguchi, Saitama (JP); Yukinori Nishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 215 days.

(21) Appl. No.: 18/064,572

(22) Filed: Dec. 12, 2022

(65) Prior Publication Data
US 2023/0114332 A1    Apr. 13, 2023

Related U.S. Application Data

(63) Continuation of application No. PCT/JP2021/024053, filed on Jun. 25, 2021.

(30) Foreign Application Priority Data

Jun. 30, 2020  (JP) ................ 2020-112549

(51) Int. Cl.
*H04N 23/60* (2023.01)
*G06T 5/50* (2006.01)
*G06V 10/74* (2022.01)

(52) U.S. Cl.
CPC ........... *H04N 23/64* (2023.01); *G06T 5/50* (2013.01); *G06V 10/761* (2022.01); *G06T 2207/20221* (2013.01)

(58) Field of Classification Search
CPC ........ H04N 23/64; H04N 23/63; H04N 23/80; G06T 5/50; G06T 2207/20221; G06V 10/761

(Continued)

(56) References Cited

U.S. PATENT DOCUMENTS

| | | | |
|---|---|---|---|
| 8,379,130 B2* | 2/2013 | Forutanpour | G11B 27/34 348/333.01 |
| 2007/0030374 A1* | 2/2007 | Ishii | H04N 23/63 348/333.01 |

(Continued)

FOREIGN PATENT DOCUMENTS

| | | |
|---|---|---|
| CN | 106161975 A | 11/2016 |
| CN | 107809579 A | 3/2018 |

(Continued)

OTHER PUBLICATIONS

Chinese Office Action and Search Report for Chinese Application No. 202180045791.8, dated Nov. 29, 2024, with an English translation.

(Continued)

*Primary Examiner* — Lin Ye
*Assistant Examiner* — Chan T Nguyen
(74) *Attorney, Agent, or Firm* — Birch, Stewart, Kolasch & Birch, LLP

(57) ABSTRACT

One embodiment according to the technology of the present disclosure provides an imaging device, an imaging method, and a program that allow a user to easily visually discriminate a difference between setting conditions by displaying video image data indicating the difference. An imaging device (1) is an imaging device 1 including a connection unit (109) that is connectable to an external device (3), and a processor (107). The processor (107) performs processing of generating first video image data from captured video image data on the basis of a first setting condition, processing of generating second video image data from the captured video image data on the basis of a second setting condition, processing of generating third video image data indicating a difference between the first setting condition and the second setting condition on the basis of the first video image data and the second video image data, and processing of output- (Continued)

ting the third video image data to the external device (3) via the connection unit.

20 Claims, 11 Drawing Sheets

(58) Field of Classification Search
USPC .................................................. 348/222.1
See application file for complete search history.

(56) References Cited

U.S. PATENT DOCUMENTS

| 2010/0194917 | A1* | 8/2010 | Funamoto | H04N 23/843 |
| | | | | 348/222.1 |
| 2013/0286207 | A1* | 10/2013 | Oba | H04N 9/74 |
| | | | | 348/148 |
| 2016/0337600 | A1 | 11/2016 | Honda | |
| 2018/0077332 | A1 | 3/2018 | Shimura et al. | |
| 2019/0287450 | A1* | 9/2019 | Urabe | G09G 3/20 |
| 2019/0364222 | A1 | 11/2019 | Ono et al. | |

FOREIGN PATENT DOCUMENTS

| JP | 2010-172462 A | 8/2010 |
| JP | 2010-183173 A | 8/2010 |
| JP | 2013-229699 A | 11/2013 |
| JP | 2019-205062 A | 11/2019 |

OTHER PUBLICATIONS

International Preliminary Report on Patentability and Written Opinion of the International Searching Authority for International Application No. PCT/JP2021/024053, dated Jan. 12, 2023, with an English translation.

International Search Report for International Application No. PCT/JP2021/024053, dated Sep. 14, 2021, with an English translation.

* cited by examiner

FIG. 11

|  | VIDEO IMAGE QUALITY SETTING | MONITOR IMAGE QUALITY SETTING | MATCH |
|---|---|---|---|
| VIDEO MODE | BT.2100 | BT.709 | NO MATCH |
| VIDEO RANGE | Limited | Limited | MATCH |

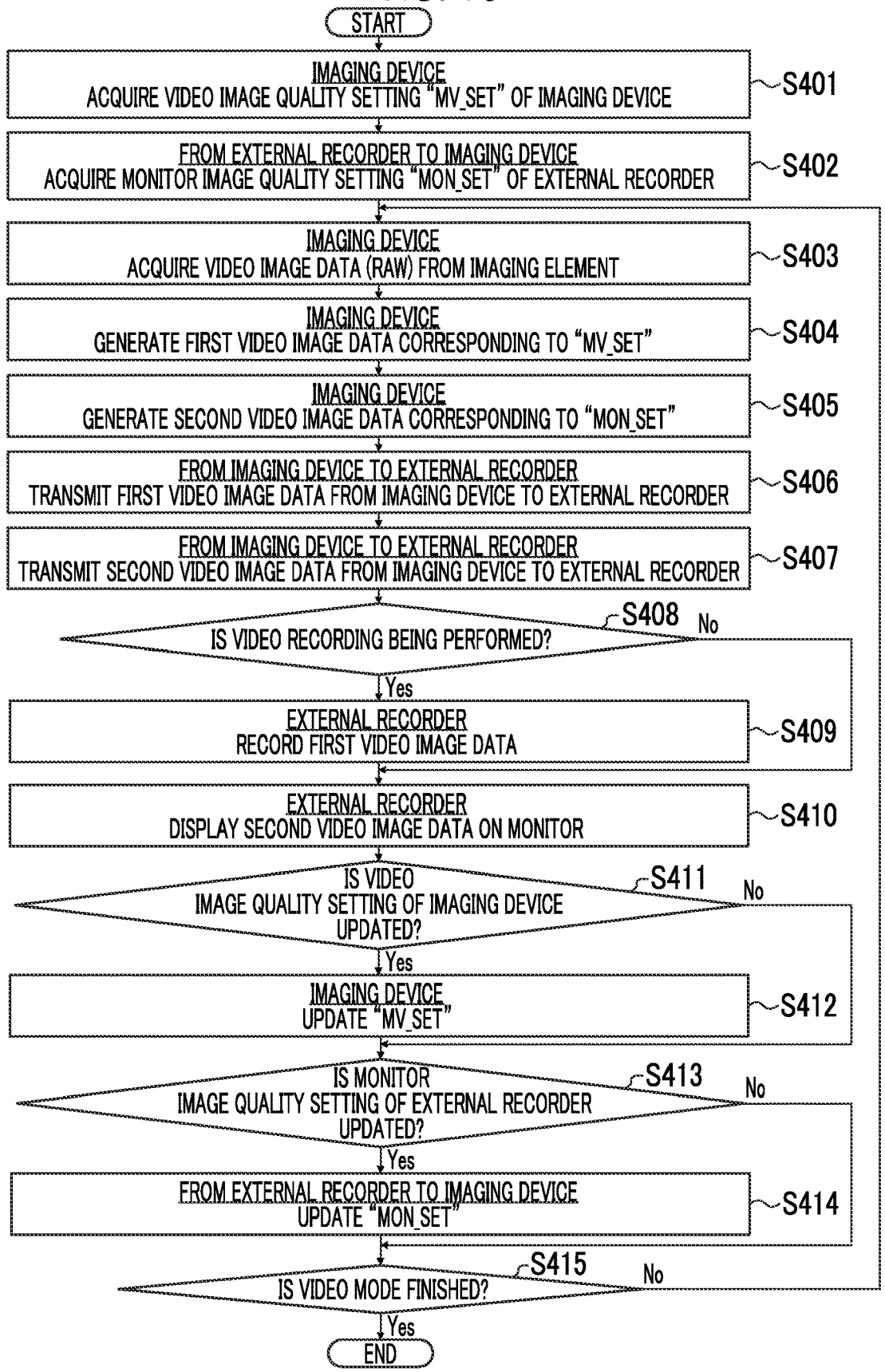

IMAGING DEVICE, IMAGING METHOD, AND PROGRAM

CROSS-REFERENCE TO RELATED APPLICATIONS

The present application is a Continuation of PCT International Application No. PCT/JP2021/024053 filed on Jun. 25, 2021 claiming priority under 35 U.S.C § 119(a) to Japanese Patent Application No. 2020-112549 filed on Jun. 30, 2020. Each of the above applications is hereby expressly incorporated by reference, in its entirety, into the present application.

BACKGROUND OF THE INVENTION

1. Field of the Invention

The present invention relates to an imaging device, an imaging method, and a program.

2. Description of the Related Art

In capturing a video image with an imaging device (for example, a digital camera), the imaging device and an external recorder may be connected to each other, and video image data may be recorded in a storage area of the external recorder. At that time, in general, a live view image captured by the imaging device is displayed on a display unit (monitor) of the external recorder.

JP2019-205062A discloses a technique of showing a relationship before and after conversion of image signals by displaying a relationship diagram. In the relationship diagram of JP2019-205062A, a relationship between scales of signals before and after the conversion of the image signals and a relationship between signal values before and after the conversion of the image signals are shown by a bar graph displayed on the left and right. A user can know the relationship before and after the conversion of the image signals from this relationship diagram.

SUMMARY OF THE INVENTION

One embodiment according to the technology of the present disclosure provides an imaging device, an imaging method, and a program that allow a user to easily visually discriminate a difference between setting conditions by displaying video image data indicating the difference.

According to an aspect of the present invention, there is provided an imaging device comprising: a connection unit that is connectable to an external device; and a processor, in which the processor performs processing of generating first video image data from captured video image data on the basis of a first setting condition, processing of generating second video image data from the captured video image data on the basis of a second setting condition, processing of generating third video image data indicating a difference between the first setting condition and the second setting condition on the basis of the first video image data and the second video image data, and processing of outputting the third video image data to the external device via the connection unit.

Preferably, the first setting condition is a condition set in the imaging device, and the second setting condition is a condition set in the external device.

Preferably, the processor generates the third video image data by alternately arranging a frame constituting the first video image data and a frame constituting the second video image data.

Preferably, the processor generates the third video image data by alternately arranging a plurality of frames constituting the first video image data and a plurality of frames constituting the second video image data.

Preferably, the processor generates the third video image data by combining a frame constituting the first video image data and a frame constituting the second video image data.

Preferably, the processor generates the third video image data by combining the frame constituting the first video image data and the frame constituting the second video image data side by side.

Preferably, the processor generates the third video image data by superimposing and combining the frame constituting the first video image data and the frame constituting the second video image data.

Preferably, the processor generates the third video image data by combining a part of the frame constituting the first video image data and a part of the frame constituting the second video image data.

Preferably, a display unit that displays display data under control of the processor is further provided, and the processor compares the first setting condition with the second setting condition and displays a comparison result on the display unit.

Preferably, the processor compares the first setting condition with the second setting condition and displays the difference between the first setting condition and the second setting condition on the display unit as the comparison result.

Preferably, the processor outputs the first video image data instead of the third video image data in a case where a signal of a recording start instruction for the external device is received via the connection unit.

Preferably, the processor generates the third video image data after generating the first video image data and the second video image data.

Preferably, the processor alternately generates the first video image data and the second video image data in conformity with the third video image data.

Preferably, the connection unit is wirelessly connected to the external device.

According to another aspect of the present invention, there is provided an imaging method using an imaging device that includes a connection unit, which is connectable to an external device, and a processor, the imaging method comprising: causing the processor to execute: a step of generating first video image data from captured video image data on the basis of a first setting condition; a step of generating second video image data from the captured video image data on the basis of a second setting condition; a step of generating third video image data indicating a difference between the first setting condition and the second setting condition on the basis of the first video image data and the second video image data; and a step of outputting the third video image data to the external device via the connection unit.

According to still another aspect of the present invention, there is provided a program for performing an imaging method using an imaging device that includes a connection unit, which is connectable to an external device, and a processor, the program causing the processor to execute: a step of generating first video image data from captured video image data on the basis of a first setting condition; a step of generating second video image data from the captured video image data on the basis of a second setting condition; a step of generating third video image data indicating a difference between the first setting condition and the second setting condition on the basis of the first video image data and the second video image data; and a step of outputting the third video image data to the external device via the connection unit.

BRIEF DESCRIPTION OF THE DRAWINGS

FIG. 11 is a diagram showing a comparison result displayed on a rear monitor of the imaging device.

FIG. 13 is a flowchart illustrating an imaging method.

DESCRIPTION OF THE PREFERRED EMBODIMENTS

Hereinafter, preferred embodiments of an imaging device, an imaging method, and a program according to the embodiment of the present invention will be described with reference to accompanying drawings.

Figure 1:
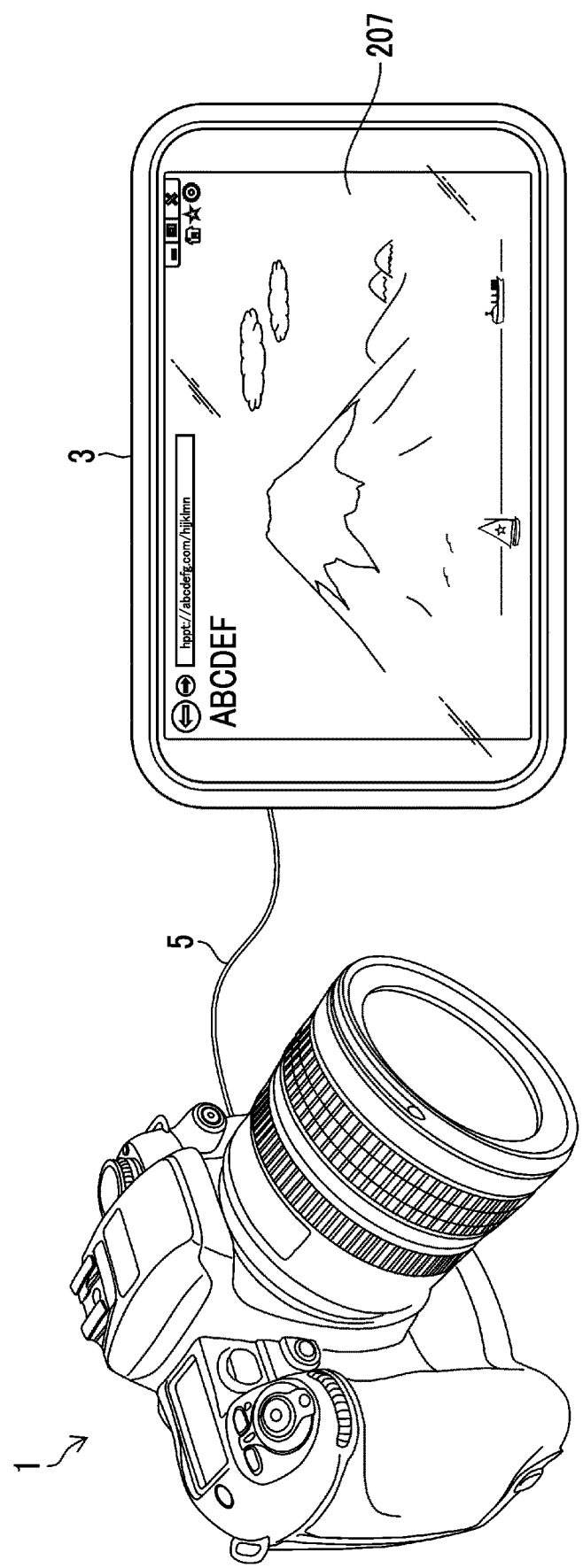
FIG. 1 is a diagram conceptually showing an imaging device and an external recorder connected to the imaging device.

FIG. 1 is a diagram conceptually showing the imaging device and an external recorder connected to the imaging device.

An imaging device (digital camera) 1 is connected to an external recorder 3 through a High-Definition Multimedia Interface (HDMI (registered trademark)) cable 5. The imaging device 1 captures a video (video image data) and a still image in response to a command from an operation unit, such as a shutter button. Further, in an imaging preparation state, a live view image, which is display data, is displayed on a rear monitor (not shown) provided on a rear surface of the imaging device 1 and/or on a viewfinder (not shown) of the imaging device 1. The imaging device 1 has an HDMI output terminal, which is an example of a connection unit 109 (FIG. 2), and is connected to the external recorder 3 via the HDMI cable 5. The imaging device 1 outputs the captured video image data to the external recorder 3 via the HDMI cable 5.

The external recorder 3 is an example of an external device that is connectable to the imaging device 1. Another example of the external device includes an external monitor. The external recorder 3 has an HDMI input terminal, which is an example of a connection unit 203 (FIG. 2), and is connected to the imaging device 1 through the HDMI cable 5. The external recorder 3 acquires the video image data captured by the imaging device 1 via the HDMI cable 5 and records the acquired video image data in a recording unit 209. Further, the external recorder 3 acquires the video image data captured by the imaging device 1 via the HDMI cable 5 and displays the acquired video image data on a display unit 207. In this example, an example is described in which the imaging device 1 and the external recorder 3 are connected to each other through the HDMI cable 5, but the present invention is not limited to this example. For example, the imaging device 1 and the external recorder 3 may be connected through a Universal Serial Bus (USB) cable, or may be wirelessly connected using, for example, Wi-Fi as described later.

Here, a type (standard) and a setting for processing video image data will be described. There are many types and settings for processing video image data. For example, there is BT.709 or BT.2100 as recommended by International Telecommunication Union-Radiocommunication Sector (ITU-R), Log video or video RAW that is independently defined by each camera manufacturer, or the like. Therefore, in order to display the video image data captured by the imaging device 1 on the display unit (monitor) 207 of the external recorder 3 with the correct color and brightness, it is necessary to change the monitor image quality setting of the external recorder 3 according to the video image quality setting of the imaging device 1. The "video image quality setting" and the "monitor image quality setting" are at least one of a color gamut, a gamma, a video range, a lookup table, or a brightness setting.

Meanwhile, the video image quality setting of the imaging device 1 and the monitor image quality setting of the external recorder 3 may not match with each other. For example, while the video image quality setting of the imaging device 1 is BT.2100, the monitor image quality setting of the external recorder 3 may be BT.709. In this case, there is a large difference in processing in the gamma and the color gamut between BT.2100 and BT.709. Therefore, the live view image displayed on the external recorder 3 that performs processing using BT.709 may become a picture having a darker exposure and a lower chroma saturation than the video image data of the imaging device 1 that performs processing using BT.2100. It is conceivable that the user may perform imaging by changing the video image quality setting of the imaging device 1 while viewing the live view image displayed on the display unit 207 of the external recorder 3. Specifically, the user may perform imaging with a video image quality setting in which the chroma saturation is increased or the exposure is increased. In that case, in the imaging device 1 in which the video image data is generated by the setting of BT.2100, the video image data may have a too high chroma saturation or a too high exposure.

Therefore, the user needs to confirm whether or not the image quality setting of the display unit 207 of the external recorder 3 is correctly set with respect to the video image quality setting of the imaging device 1. In that respect, in the present embodiment, it is possible to easily visually discriminate whether or not the monitor image quality setting of the display unit 207 of the external recorder 3 is correctly set with respect to the video image quality setting of the imaging device 1.

Figure 2:
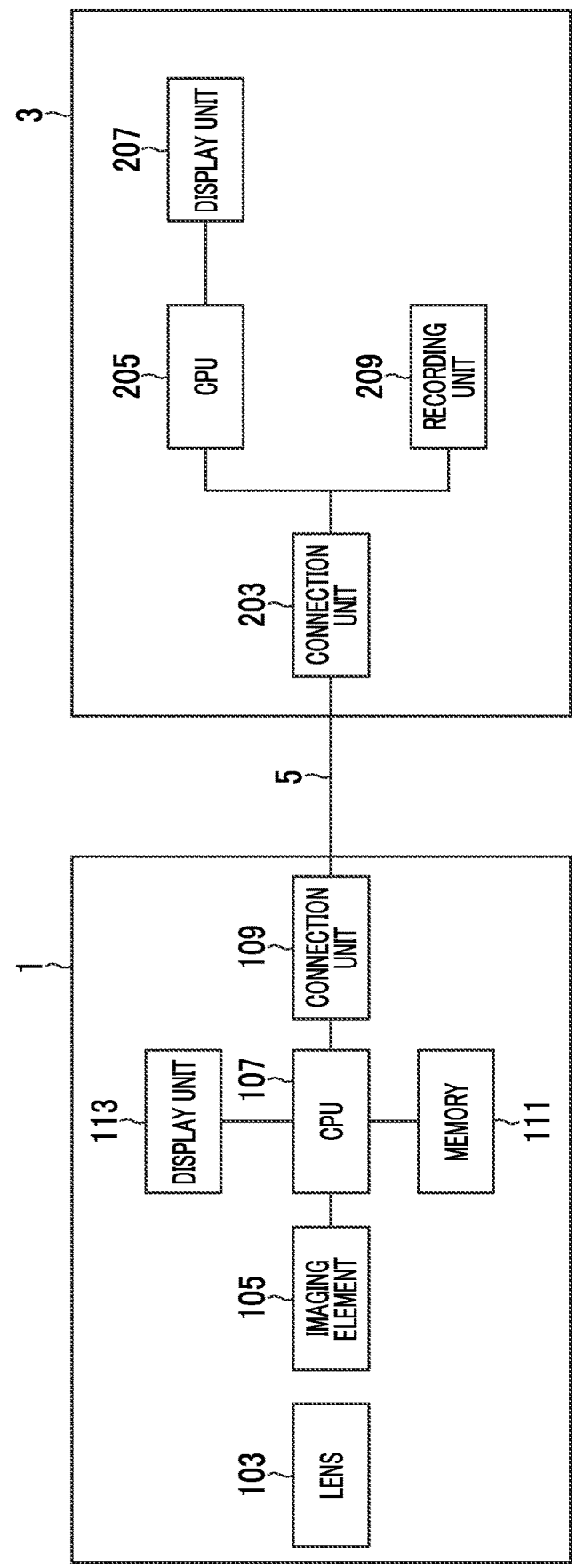
FIG. 2 is a block diagram showing main functions of the imaging device and of the external recorder.

FIG. 2 is a block diagram showing the main functions of the imaging device 1 and of the external recorder 3.

The imaging device 1 mainly comprises a lens 103, an imaging element 105, a central processing unit (CPU) (processor) 107, a display unit 113, a memory 111, and the connection unit 109. Further, the external recorder 3 mainly comprises the connection unit 203, a CPU 205, the display unit 207, and the recording unit 209.

The lens 103 forms a subject image (optical image) on the imaging element 105. Although not shown, the lens 103 has a control mechanism, such as a stop, and the imaging device 1 has, for example, a shutter for controlling the formation of the subject image on the imaging element 105.

The imaging element 105 comprises a light-receiving surface in which a large number of light-receiving elements are arranged in a matrix form. Light corresponding to the subject image formed on the light-receiving surface of the imaging element 105 is received by each light-receiving element and is converted into an electrical signal. A color filter of red (R), green (G), or blue (B) is provided on the light-receiving surface of the imaging element 105, and a color image of the subject can be acquired on the basis of a signal of each color. Various imaging elements, such as a complementary metal-oxide semiconductor (CMOS) and a charge-coupled device (CCD), can be used as the imaging element 105. The imaging element 105 performs noise removal, amplification, and the like of an analog image signal via an internal analog front-end (AFE) (not shown), and converts the analog image signal into a digital image signal with a gradation width via an internal analog/digital converter (A/D converter) (not shown) provided in the same manner. Here, the AFE and the A/D converter may be externally connected. The video image data captured by the imaging device 1 is composed of data consisting of a plurality of frames, and each frame is generated as the digital image signal as described above.

The CPU 107 performs image processing on the digital image signal (a signal composed of the frame constituting the video image data). The CPU 107 performs image processing, such as color signal separation, white balance adjustment, and gamma correction, on the digital image signal. The CPU 107 performs each image processing on the digital image signal according to the type and the setting of the video described above. The image processing performed by the CPU 107 will be described later.

In addition, the CPU 107 performs other general control for the imaging device 1. The CPU 107 reads out necessary programs and information used to perform various types of control, from the memory 111, to perform various types of processing and various types of control. The memory 111 is an internal memory of the imaging device 1, and stores programs necessary for various types of imaging of the imaging device 1. Further, the CPU 107 controls the display of the display unit 113. Specific examples of the display unit 113 include a rear monitor and an electronic viewfinder of the imaging device 1.

The connection unit 109 of the imaging device 1 and the connection unit 203 of the external recorder 3 are connected to each other by the HDMI cable 5. The video image data is input from the imaging device 1 to the connection unit 203 of the external recorder 3. The external recorder 3 records the input video image data in the recording unit 209. Further, the CPU 205 displays the input video image data on the display unit 207. Here, the connection unit is connected to the display unit 207 by way of the CPU 205, but the display unit 207 may be connected to the connection unit 203, and, for example, the CPU 205 may control the display unit. The CPU 205 performs general control including recording control of the external recorder 3 to the recording unit 209 described above. The CPU 205 reads out necessary programs and information used to perform various types of control, from a memory (not shown) of the external recorder 3, to perform various types of processing and various types of control performed by the CPU 205.

The hardware structures of the CPU 107 and the CPU 205 are various processors as described below. The various processors include, for example, a CPU which is a general-purpose processor that executes software (programs) to act as various functional units, a programmable logic device (PLD) which is a processor having a changeable circuit configuration after manufacture, such as a field programmable gate array (FPGA), and a dedicated electric circuit which is a processor having a dedicated circuit configuration designed to execute specific processing, such as an application specific integrated circuit (ASIC).

One functional unit may be composed of one of these various processors or may be composed of a combination of two or more processors of the same type or different types (for example, a plurality of FPGAs or a combination of the CPU and the FPGA). Alternatively, the plurality of functional units may be composed of one processor. A first example in which the plurality of functional units are composed of one processor is an aspect in which one or more CPUs and software are combined to constitute one processor and the processor acts as the plurality of functional units, as typified by a computer used for a client, a server, or the like. A second example is an aspect in which a processor that realizes the functions of the entire system including a plurality of functional units with one integrated circuit (IC) chip is used, as typified by system on chip (SoC) and the like. As described above, various functional units are composed of one or more of the various processors described above as the hardware structure.

Figure 3:
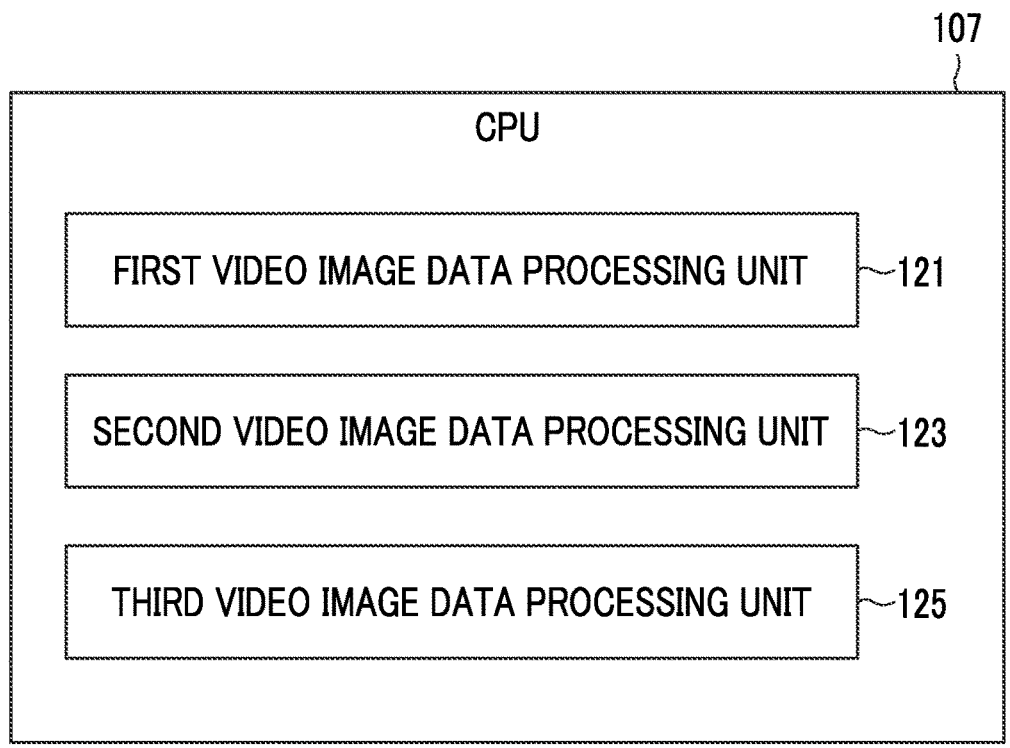
FIG. 3 is a block diagram showing a processing function of video image data realized by a CPU.

FIG. 3 is a block diagram showing a processing function of the video image data realized by the CPU 107.

The CPU 107 comprises a first video image data processing unit 121, a second video image data processing unit 123, and a third video image data processing unit 125.

The first video image data processing unit 121 processes video image data (RAW) on the basis of the video image quality setting (first setting condition). Here, the video image data (RAW) is video image data that has not yet been subjected to image processing, and is data that has the information of the subject image captured by the imaging element 105 as it is. The video image quality setting is a condition set in the imaging device 1, and the first video image data processed with the video image quality setting is used for the video image data to be recorded or for the live view image. For example, the video image quality setting is hybrid log-gamma (HLG) or perceptual quantization (PQ) of BT.2100.

The second video image data processing unit 123 processes the video image data (RAW) on the basis of the monitor image quality setting (second setting condition). The monitor image quality setting is a condition set in the external recorder 3, and the second video image data processed with the monitor image quality setting is displayed on the display unit 207 of the external recorder 3. For example, in a case where the monitor image quality setting of the display unit 207 of the external recorder 3 is BT.709, the second video image data processing unit 123 processes the video image data (RAW) on the basis of BT.709.

The third video image data processing unit 125 generates third video image data indicating a difference between the video image quality setting and the monitor image quality setting, on the basis of the first video image data and the second video image data. The user can visually easily discriminate the difference between the video image quality setting and the monitor image quality setting by viewing the third video image data.

For example, in a case where the video image quality setting of the imaging device 1 and the monitor image quality setting of the display unit 207 of the external recorder 3 are different from each other, the first video image data and the second video image data have a different image quality therebetween. Therefore, the user can easily visually discriminate the different image quality by viewing the third video image data displayed on the display unit 207. On the other hand, in a case where the video image quality setting of the imaging device 1 and the monitor image quality setting of the display unit 207 of the external recorder 3 match with each other, the first video image data and the second video image data have the same image quality. Therefore, the user can easily visually discriminate the same image quality by viewing the third video image data displayed on the display unit 207.

Figure 4:
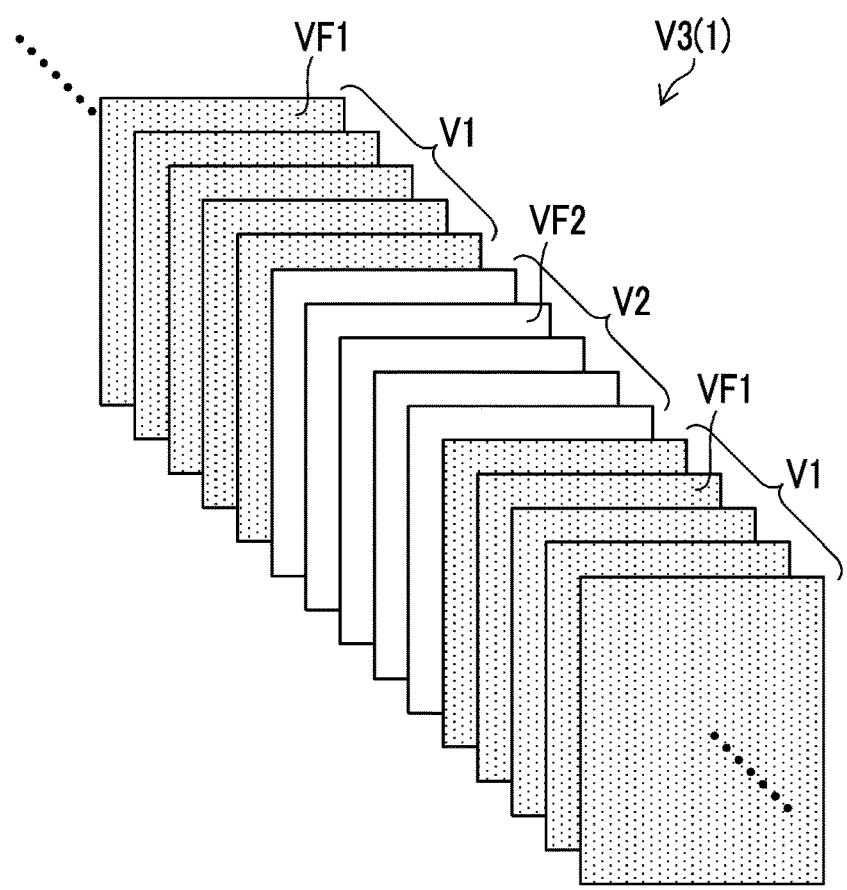
FIG. 4 is a schematic diagram showing an example of third video image data.

FIG. 4 is a schematic diagram showing an example of the third video image data. Third video image data V3(1) is generated by alternately arranging a plurality of first frames VF1 constituting first video image data V1 and a plurality of second frames VF2 constituting second video image data V2 in chronological order. In the third video image data V3(1), the first frame VF1 and the second frame VF2 are arranged every 5 frames in chronological order. The first frame VF1 is processed by the video image quality setting, and the second frame VF2 is processed by the monitor image quality setting.

In a case where the video image quality setting and the monitor image quality setting are different from each other, the first frame VF1 and the second frame VF2 have a different image quality therebetween. In such a case, in a case where the third video image data V3(1) is displayed on the display unit 207, the first frame VF1 and the second frame VF2 having a different image quality are repeatedly displayed at a predetermined interval. Therefore, since the image quality of the displayed third video image data V3(1) is repeatedly changed, the user can easily visually discriminate that the video image quality setting and the monitor image quality setting are different from each other. On the other hand, in a case where the video image quality setting and the monitor image quality setting are the same, the first frame VF1 and the second frame VF2 have the same image quality. Therefore, since the image quality of the third video image data V3(1) is stably displayed without being changed, the user can easily visually discriminate that the video image quality setting and the monitor image quality setting are the same.

In the third video image data V3(1), the plurality of first frames VF1 and the plurality of second frames VF2 are alternately arranged in chronological order as shown in FIG. 4. For example, in the third video image data V3(1), the first video image data (the plurality of first frames VF1) and the second video image data (the plurality of second frames VF2) may be alternately arranged every second. Alternatively, the third video image data V3(1) may be formed by alternately arranging the first frame VF1 and the second frame VF2 every single frame.

Figure 5:
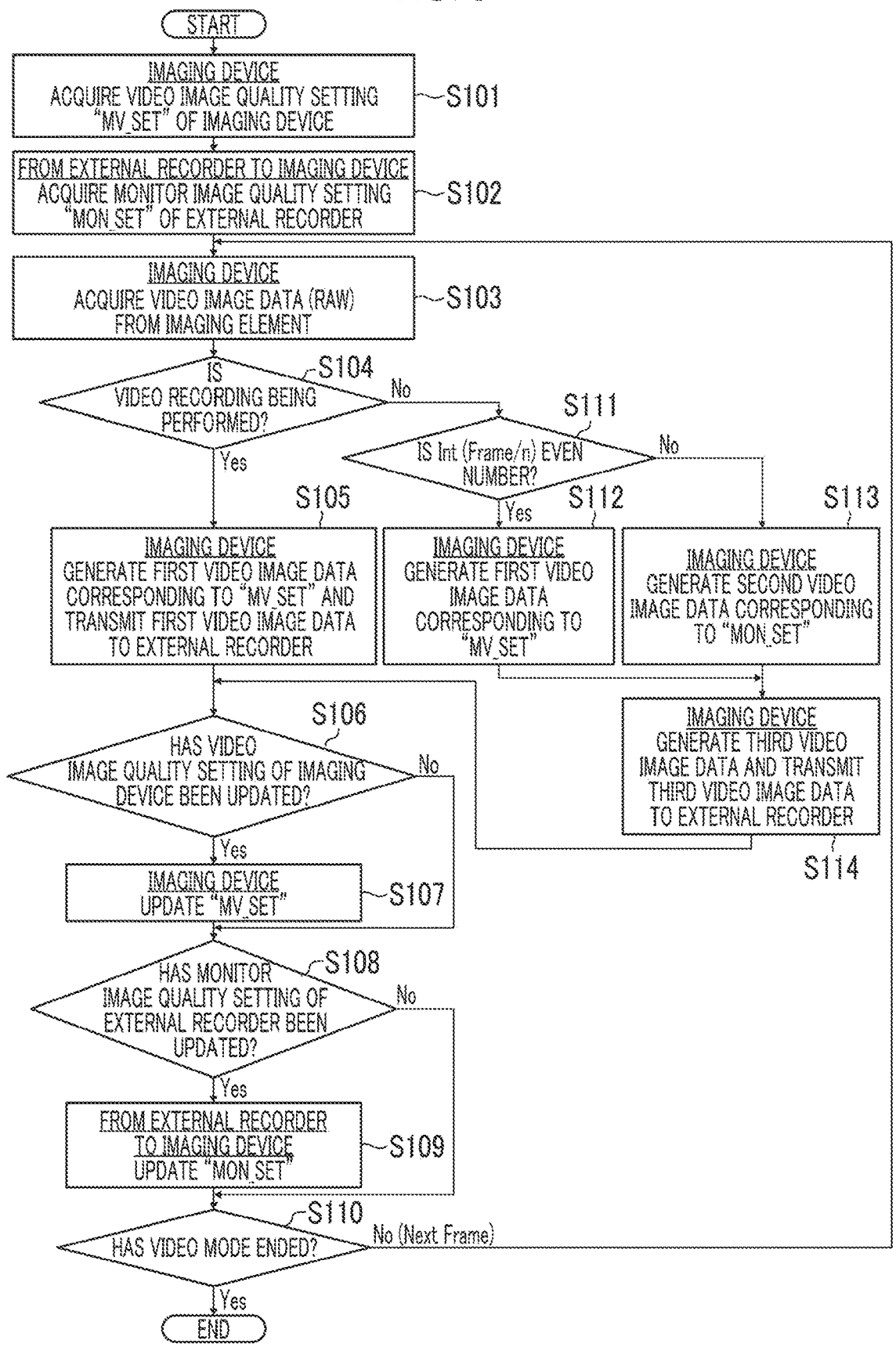
FIG. 5 is a flowchart illustrating an imaging method.

FIG. 5 is a flowchart illustrating an imaging method (and a program for executing the imaging method) using the imaging device 1 to which the external recorder 3 is connected.

First, the first video image data processing unit 121 of the imaging device 1 acquires a video image quality setting "MV_SET" of the imaging device 1 (step S101). Next, a monitor image quality setting "MON_SET" of the external recorder 3 is transmitted from the external recorder 3 (CPU 205) to the imaging device 1 via the HDMI cable 5, and the second video image data processing unit 123 of the imaging device 1 acquires the monitor image quality setting "MON_SET" (step S102).

Next, the CPU 107 acquires the video image data (RAW) from the imaging element 105 (step S103). Specifically, the frames constituting the video image data (RAW) are acquired in the order of frame numbers in chronological order. After that, the CPU 107 receives the signal of the recording start instruction and determines whether or not video recording is being performed (step S104). In a case where the CPU 107 determines that the video recording is being performed, the first video image data processing unit 121 of the imaging device 1 generates the first video image data corresponding to the "MV_SET" and transmits the first video image data to the external recorder 3 (step S105). On the other hand, in a case where the CPU 107 determines that the video recording is not being performed, the third video image data processing unit 125 determines whether or not the number calculated by the following expression is an even number (step S111).

$$\text{Int(Frame}/n)\qquad\text{Expression:}$$

Here, Int (α) in the expression means truncating a decimal fraction of the number α in parentheses, Frame means a frame number of the video image data (RAW), and n means a frame period of processing switching. The user can arbitrarily decide the frame period n of the processing switching.

In a case where the CPU 107 determines that the number calculated by the expression is an even number, the first video image data processing unit 121 generates the first video image data corresponding to the "MV_SET" and transmits the first video image data to the third video image data processing unit 125 (step S112). On the other hand, in a case where the CPU 107 determines that the number calculated by the expression is not an even number, the second video image data processing unit 123 generates the second video image data corresponding to the "MON_SET", and transmits the second video image data to the third video image data processing unit 125 (step S113). Then, the third video image data processing unit 125 generates the third video image data by using the generated first and second video image data, and transmits the third video image data to the external recorder 3 (step S114). As described above, in the present embodiment, the first video image data and the second video image data are generated by being switched therebetween according to the number of Frame (frame number)/n (frame period of processing switching), and then the third video image data is generated. As a result, it is possible to efficiently perform processing of generating the first video image data and processing of generating the second video image data with respect to the video image data (RAW).

After that, the CPU 107 determines whether or not the video image quality setting of the imaging device 1 has been updated (step S106). In a case where the video image quality setting of the imaging device 1 has been updated, the CPU 107 updates the "MV_SET" of the imaging device 1 (step S107).

Next, the CPU 107 determines whether or not the monitor image quality setting of the external recorder 3 has been updated (step S108). After that, the updated "MON_SET" is transmitted from the external recorder 3 to the imaging device 1 (step S109). After that, the CPU 107 determines whether or not the video mode has ended (step S110), and in a case where the video mode has not ended, the process returns to step S103, and the next frame of the video image data (RAW) is processed.

As described above, in the present embodiment, the third video image data processing unit 125 generates the third video image data in which the plurality of first frames VF1 and the plurality of second frames VF2 are alternately arranged. Then, the user can easily visually discriminate whether or not the video image quality setting and the monitor image quality setting are correctly set by viewing the third video image data displayed on the display unit 207 of the external recorder 3.

Each of the above-mentioned configurations and functions can be appropriately realized by using any hardware, software, or a combination of both. Further, the CPU 107 may perform the video image data processing instead of each video image data processing unit. For example, the present invention can also be applied to a program causing a computer to execute the above-mentioned processing steps (processing procedures), a computer-readable recording medium (non-transitory recording medium) on which such a program is recorded, or a computer on which such a program can be installed.

Modification Example of First Embodiment

Next, a modification example of the first embodiment will be described. In the first embodiment, the first video image data or the second video image data is generated in conformity with the frame numbers of the frames constituting the video image data (RAW) (see steps S111 to S113 of FIG. 5). In this example, the first video image data and the second video image data are generated together for the frames constituting the video image data (RAW).

Figure 6:
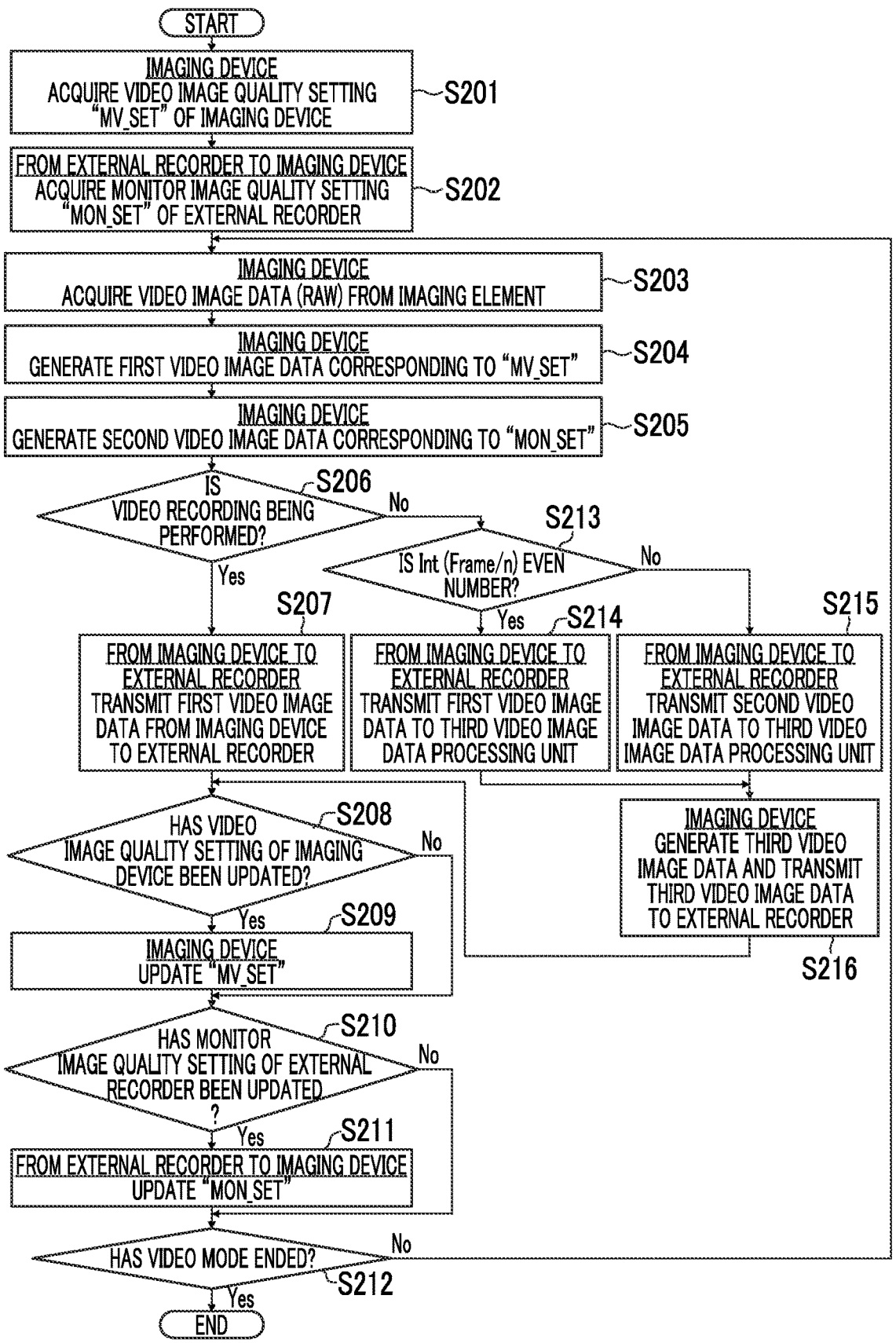
FIG. 6 is a flowchart illustrating an imaging method.

FIG. 6 is a flowchart illustrating an imaging method (and a program for executing the imaging method) using the imaging device 1 to which the external recorder 3 is connected.

First, the first video image data processing unit 121 of the imaging device 1 acquires the video image quality setting "MV_SET" of the imaging device 1 (step S201). Next, the monitor image quality setting "MON_SET" of the external recorder 3 is transmitted from the external recorder 3 (CPU 205) to the imaging device 1 via the HDMI cable 5, and the second video image data processing unit 123 of the imaging device 1 acquires the monitor image quality setting "MON_SET" (step S202).

Next, the CPU 107 acquires the video image data (RAW) from the imaging element 105 (step S203). After that, the first video image data processing unit 121 generates the first video image data of the "MV_SET" (step S204). In addition, the second video image data processing unit 123 generates the second video image data of the "MON_SET" (step S205).

After that, the CPU 107 receives the signal of the recording start instruction and determines whether or not video recording is being performed (step S206). In a case where the CPU 107 determines that the video recording is being performed, the first video image data processing unit 121 generates the first video image data corresponding to the "MV_SET" and transmits the first video image data to the external recorder 3 (step S207). On the other hand, in a case where the CPU 107 determines that the video recording is not being performed, the third video image data processing unit 125 determines whether or not the number calculated by the above-mentioned expression (see step S111 of FIG. 5) is an even number (step S213).

Then, in a case where the CPU 107 determines that the number calculated by the expression is an even number, the first video image data processing unit 121 of the imaging device 1 transmits the first video image data corresponding to the "MV_SET" to the third video image data processing unit 125 (step S214). On the other hand, in a case where the CPU 107 determines that the number calculated by the expression is not an even number, the second video image data processing unit 123 of the imaging device 1 transmits the second video image data corresponding to the "MON_SET" to the third video image data processing unit 125 (step S215). After that, the third video image data processing unit 125 generates the third video image data by using the generated first and second video image data, and transmits the third video image data to the external recorder 3 (step S216). As described above, in this example, the first video image data and the second video image data are generated together for the frames constituting the video image data (RAW). As a result, the first video image data and the second video image data are provided for all the frames constituting the video image data (RAW).

Since subsequent steps S208 to S212 correspond to steps S106 to S110 illustrated in FIG. 5, the description thereof will be omitted.

As described above, in this example, the third video image data processing unit 125 also generates the third video image data in which the plurality of first frames VF1 constituting the first video image data V1 and the plurality of second frames VF2 constituting the second video image data V2 are alternately arranged. Since the third video image data is displayed on the display unit 207 of the external recorder 3, the user can easily visually discriminate whether or not the video image quality setting of the imaging device 1 and the monitor image quality setting of the display unit 207 of the external recorder 3 are correctly set.

Second Embodiment

Next, a second embodiment will be described. In the second embodiment, the third video image data (third frame VF3) is generated by combining the first frame VF1 and the second frame VF2. That is, in the present embodiment, the third video image data indicating the difference between the video image quality setting and the monitor image quality setting is generated by combining the first frame and the second frame.

A specific example of the third video image data of the present embodiment will be described with reference to FIGS. 7 to 9.

Figure 7:
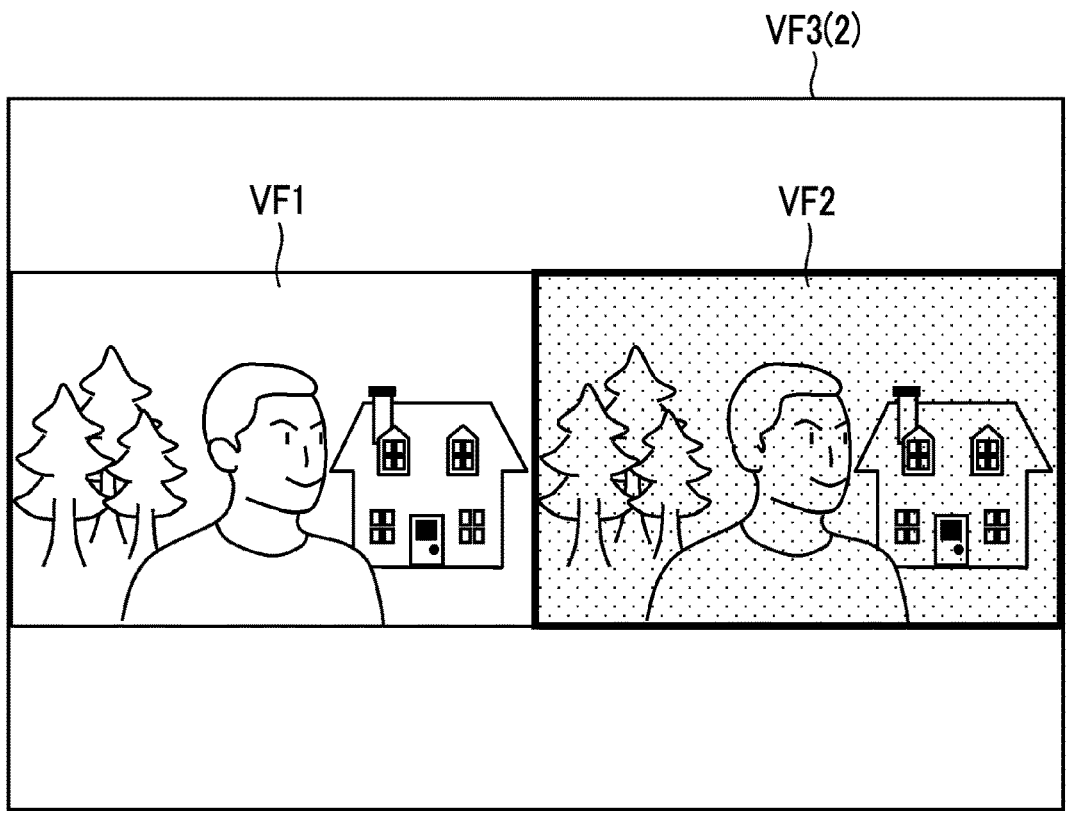
FIG. 7 is a schematic diagram showing an example of the third video image data.

FIG. 7 is a schematic diagram showing an example of the third video image data of the present embodiment. A third frame VF3(2) constituting the third video image data shown in FIG. 7 is obtained by combining the first frame VF1 constituting the first video image data and the second frame VF2 constituting the second video image data side by side. Specifically, the third frame VF3(2) is formed by disposing the first frame VF1 on a left side and the second frame VF2 on a right side side by side when facing the third frame VF3(2) to combine the first frame VF1 and the second frame VF2. In this way, the first frame VF1 and the second frame VF2 are arranged, so that the user can easily visually discriminate the difference between the video image quality setting and the monitor image quality setting.

Figure 8:
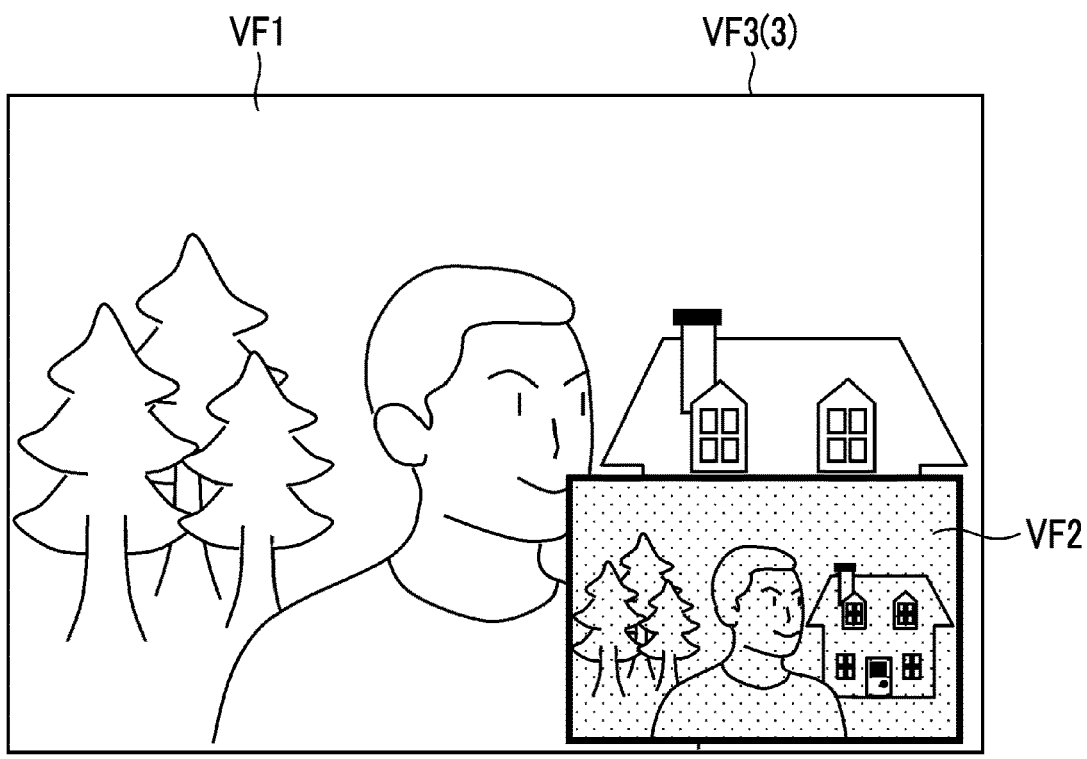
FIG. 8 is a schematic diagram showing an example of the third video image data.

FIG. 8 is a schematic diagram showing an example of the third video image data of the present embodiment. A third frame VF3(3) constituting the third video image data shown in FIG. 8 is obtained by superimposing and combining the first frame VF1 constituting the first video image data and the second frame VF2 constituting the second video image data. Specifically, as shown in FIG. 8, the third frame VF3(3) is formed by superimposing and displaying the second frame VF2 on a part of a region of the first frame VF1. In this way, the second frame VF2 is superimposed and displayed on a part of the region of the first frame VF1, so that the user can easily visually discriminate the difference between the video image quality setting and the monitor image quality setting.

Figure 9:
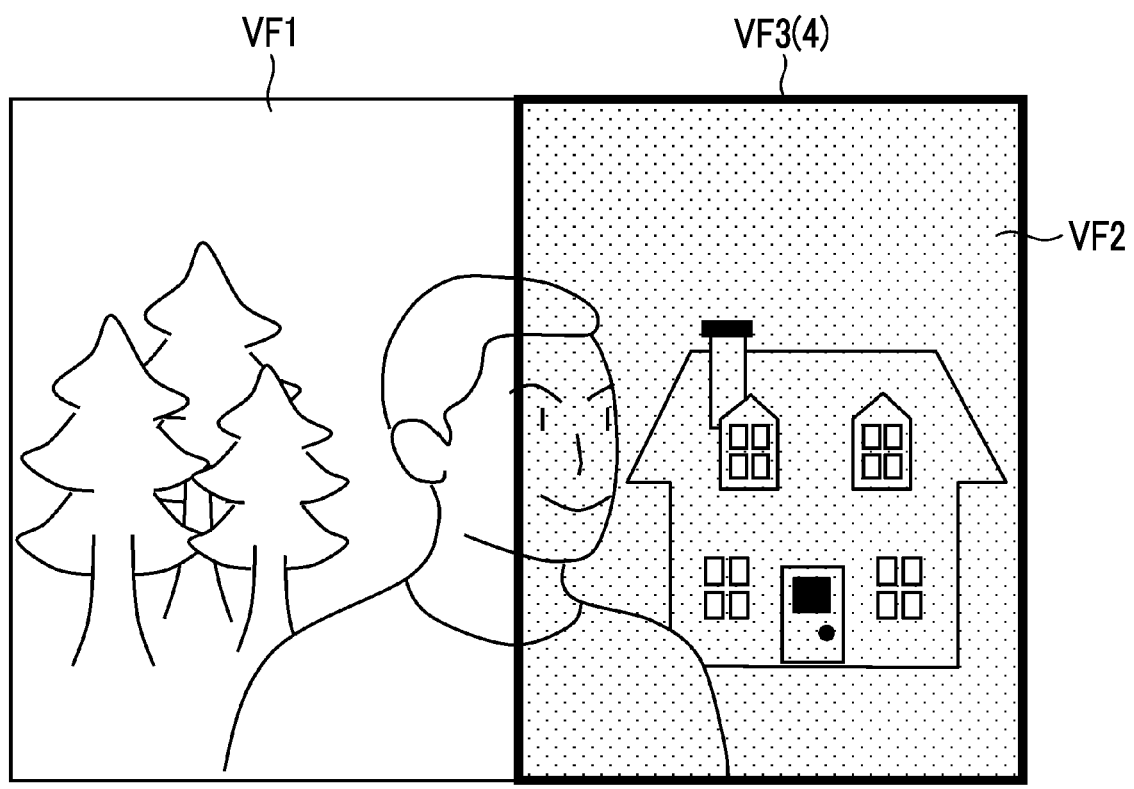
FIG. 9 is a schematic diagram showing an example of the third video image data.

FIG. 9 is a schematic diagram showing an example of the third video image data of the present embodiment. A third frame VF3(4) constituting the third video image data shown in FIG. 9 is obtained by combining a part of the first frame VF1 constituting the first video image data and a part of the second frame VF2 constituting the second video image data. Specifically, the third frame VF3(4) is formed by combining an image of a left half of the first frame VF1 and an image of a right half of the second frame VF2 side by side when facing the third frame VF3(4). In this way, the image of the left half of the first frame VF1 and the image of the right half of the second frame VF2 are combined, so that the user can easily visually discriminate the difference between the video image quality setting and the monitor image quality setting.

Figure 10:
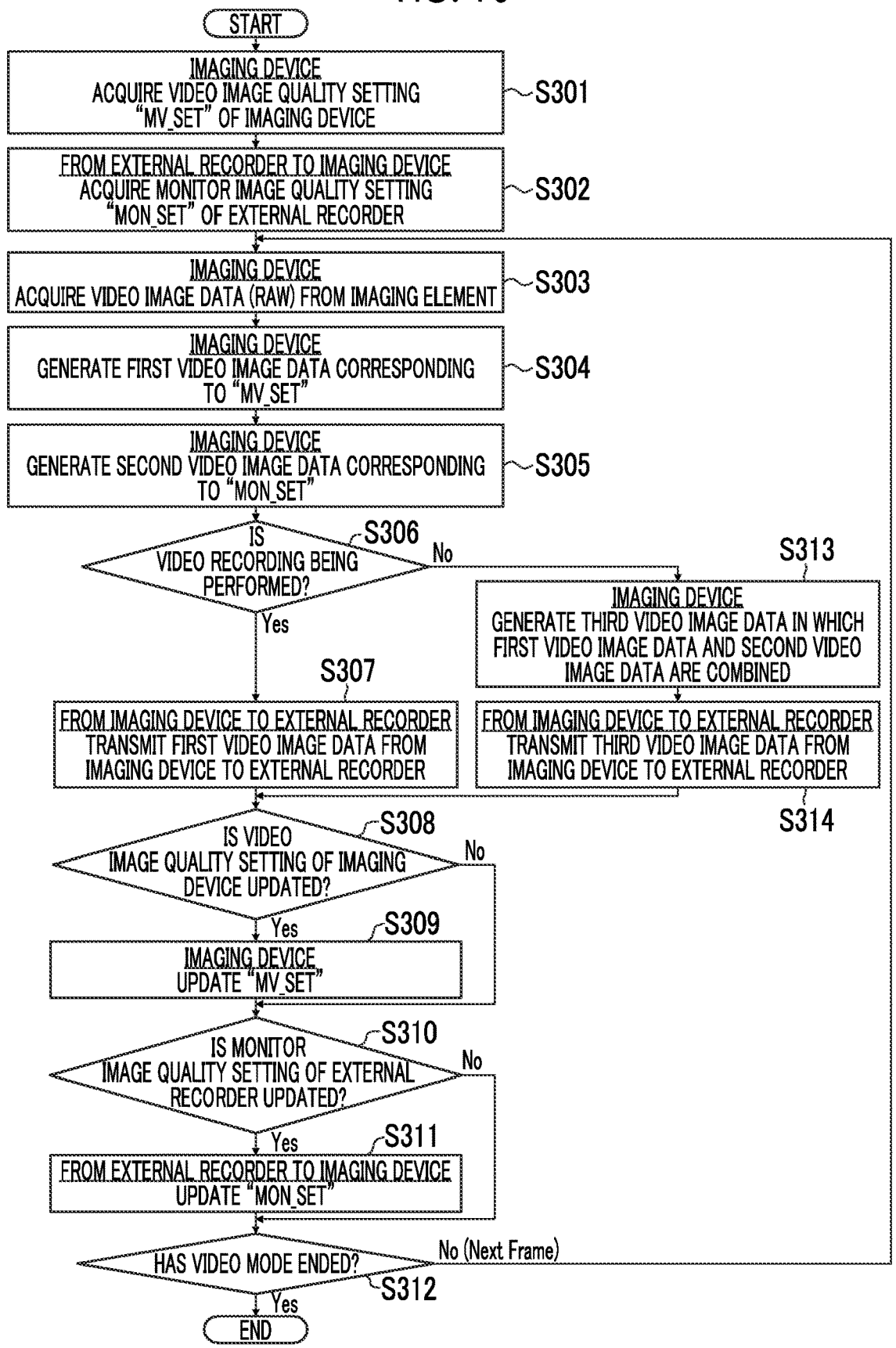
FIG. 10 is a flowchart illustrating an imaging method.

FIG. 10 is a flowchart illustrating an imaging method (and a program for executing the imaging method) according to the present embodiment.

First, the first video image data processing unit 121 of the imaging device 1 acquires the video image quality setting "MV_SET" of the imaging device 1 (step S301). Next, the monitor image quality setting "MON_SET" of the external recorder 3 is transmitted from the external recorder 3 (CPU 205) to the imaging device 1 via the HDMI cable 5, and the second video image data processing unit 123 of the imaging device 1 acquires the monitor image quality setting "MON_SET" (step S302).

Next, the CPU 107 acquires the video image data (RAW) from the imaging element 105 (step S303). Then, the first video image data processing unit 121 generates the first video image data corresponding to the "MV_SET" (step S304). In addition, the second video image data processing unit 123 generates the second video image data corresponding to the "MON_SET" (step S305).

After that, the CPU 107 receives the signal of the recording start instruction and determines whether or not video recording is being performed (step S306). In a case where the CPU 107 determines that the video recording is being performed, the first video image data processing unit 121 transmits the first video image data to the external recorder 3 (step S307). On the other hand, in a case where the CPU 107 determines that the video recording is not being performed, the third video image data processing unit 125 generates the third video image data in which the first video image data and the second video image data are combined (step S313). After that, the third video image data is transmitted from the imaging device 1 to the external recorder 3 (step S314).

Since subsequent steps S308 to S312 correspond to steps S106 to S110 illustrated in FIG. 5, the description thereof will be omitted.

As described above, in the present embodiment, the third video image data processing unit 125 generates the third video image data in which the first frame VF1 and the second frame VF2 are combined. Then, the user checks the third video image data displayed on the display unit 207 of the external recorder 3, so that the user can easily visually discriminate whether or not the video image quality setting of the imaging device 1 and the monitor image quality setting of the display unit 207 of the external recorder 3 are correctly set.

Another Example 1

Next, another example 1 will be described.

In another example 1, the CPU 107 displays a comparison result between the video image quality setting and the monitor image quality setting on the display unit (the rear monitor or the electronic viewfinder) 113 of the imaging device 1.

FIG. 11 is a diagram showing the comparison result displayed on the rear monitor of the imaging device 1. The CPU 107 displays a comparison result 7 between the video image quality setting and the monitor image quality setting on the rear monitor. In the case shown in FIG. 11, the video mode is "BT.2100", and the video range is "Limited", in the video image quality setting of the imaging device 1. Further, the video mode is "BT.709", and the video range is "Limited", in the monitor image quality setting of the external recorder 3. Further, "match" (or "OK") is displayed in a case where the video image quality setting of the imaging device 1 and the monitor image quality setting of the external recorder 3 match with each other, and "no match" (or "NG") is displayed in a case where the video image quality setting of the imaging device 1 and the monitor image quality setting of the external recorder 3 do not match with each other. In this way, whether or not the setting conditions match with each other, that is, the difference between the setting conditions, is shown, so that the user can easily discriminate which setting of the external recorder 3 should be changed to match with the video image quality setting of the imaging device 1.

Another Example 2

Next, another example 2 will be described.

In another example 2, the imaging device 1 and the external recorder 3 are wirelessly connected to each other.

Figure 12:
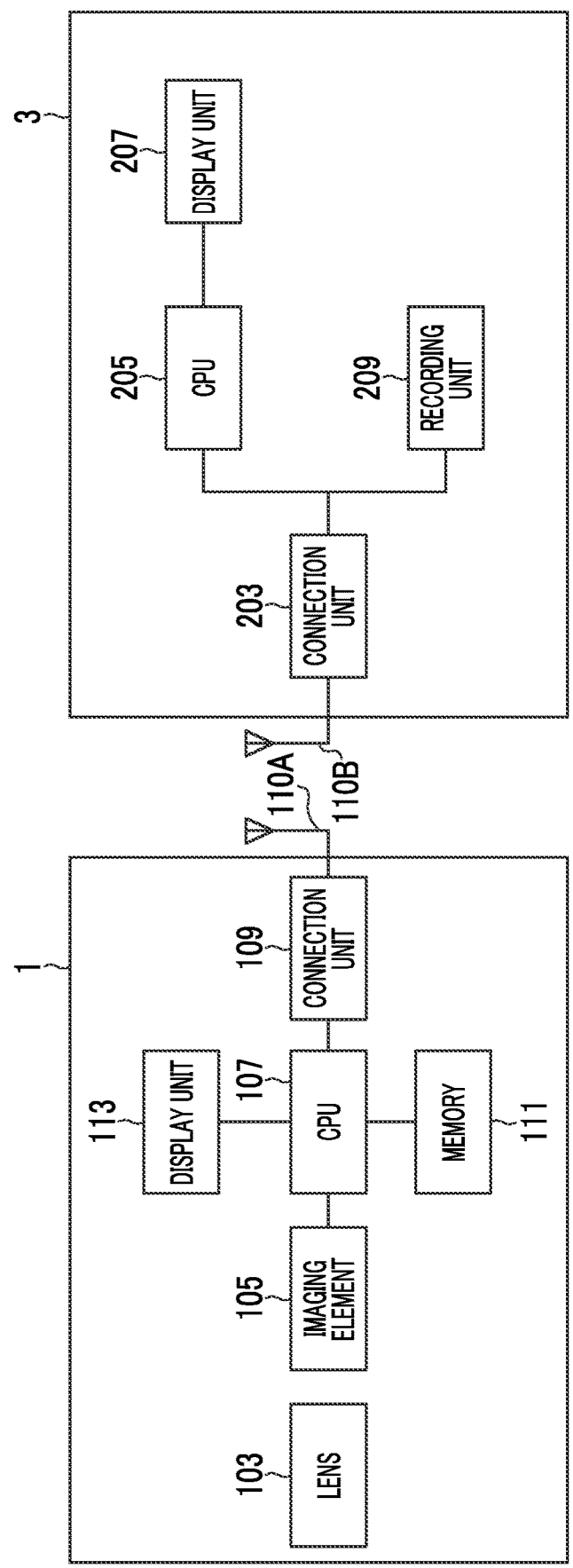
FIG. 12 is a block diagram showing functions of the imaging device and of the external recorder.

FIG. 12 is a block diagram showing the functions of the imaging device 1 and of the external recorder 3 of this example. The parts already illustrated in FIG. 2 are designated by the same reference numerals, and the description thereof will be omitted.

The imaging device 1 and the external recorder 3 are wirelessly connected to each other. Specifically, in the imaging device 1, the connection unit 109 has a communication unit (antenna) 110A and is wirelessly connected to a communication unit (antenna) 110B to transmit the captured video image data to the external recorder 3. Specific examples of the wireless connection include connection through Wi-Fi, ultra-wideband (UWB), wireless HDMI, and a wireless serial digital interface (SDI).

Another Example 3

Next, another example 3 will be described.

In another example 3, control is performed on the imaging device 1 side such that a live view image that enables checking of the exposure and the color is obtained even in a case where the monitor image quality setting of the external recorder 3 and the video image quality setting of the imaging device 1 are different from each other. For example, this example is effective in a case where the monitor image quality setting of the external recorder 3 that matches with the video image quality setting of the imaging device 1 does not exist.

FIG. 13 is a flowchart illustrating the imaging method of this example (and a program for executing the imaging method).

First, the first video image data processing unit 121 of the imaging device 1 acquires the video image quality setting "MV_SET" of the imaging device 1 (step S401). After that, the monitor image quality setting "MON_SET" of the external recorder 3 is transmitted from the external recorder 3 to the imaging device 1, and the second video image data processing unit 123 of the imaging device 1 acquires the monitor image quality setting "MON_SET" (step S402).

After that, the imaging device 1 acquires the video image data (RAW) from the imaging element 105 (step S403). After that, the first video image data processing unit 121 generates the first video image data through first image processing corresponding to the "MV_SET" (step S404). Next, the second video image data processing unit 123 generates the second video image data through second image processing corresponding to the "MON_SET" (step S405). Next, the first video image data is transmitted from the imaging device 1 to the external recorder 3 (step S406). After that, the second video image data is transmitted from the imaging device 1 to the external recorder 3 (step S407).

After that, the CPU 107 determines whether or not video recording is being performed (step S408). In a case where the CPU 107 determines that the video recording is being performed, the external recorder 3 records the first video image data (step S409). On the other hand, in a case where the CPU 107 determines that the video recording is not being performed, the external recorder 3 displays the second video image data on the display unit (monitor) 207 (step S410).

Since subsequent steps S411 to S415 correspond to steps S106 to S110 illustrated in FIG. 5, the description thereof will be omitted.

As described above, the imaging device 1 generates the first video image data of the video image quality setting and the second video image data of the monitor image quality setting and transmits the first and second video image data to the external recorder 3. The external recorder 3 records the first video image data in a case of performing video recording, and displays the second video image data on the display unit (monitor) 207. As a result, the live view image that enables checking of the exposure and the color can be displayed on the display unit 207 even in a case where the monitor image quality setting of the external recorder 3 that matches with the video image quality setting of the imaging device 1 does not exist.

Although the examples of the present invention have been described above, the present invention is not limited to the above-mentioned embodiments, and it goes without saying that various modifications can be made without departing from the gist of the present invention.

EXPLANATION OF REFERENCES

1: imaging device
3: external recorder
5: HDMI cable
103: lens
105: imaging element
107: CPU
109: connection unit
111: memory
113: display unit
121: first video image data processing unit
123: second video image data processing unit
125: third video image data processing unit
203: connection unit
205: CPU
207: display unit
209: recording unit

What is claimed is:

1. An imaging device comprising:
a connection unit that is connectable to an external device; and
a processor configured to perform:
processing of generating first video image data from captured video image data on the basis of a first setting condition;
processing of generating second video image data from the captured video image data on the basis of a second setting condition;
processing of generating third video image data indicating a difference between the first setting condition and the second setting condition on the basis of the first video image data and the second video image data; and
processing of outputting the third video image data to the external device via the connection unit,
wherein the first setting condition is a condition set in the imaging device, and the second setting condition is a condition set in the external device.

2. The imaging device according to claim 1, wherein the processor generates the third video image data by alternately arranging a frame constituting the first video image data and a frame constituting the second video image data.

3. The imaging device according to claim 1, wherein the processor generates the third video image data by alternately arranging a plurality of frames constituting the first video image data and a plurality of frames constituting the second video image data.

4. The imaging device according to claim 3, wherein the processor alternately generates the first video image data and the second video image data in conformity with the third video image data.

5. The imaging device according to claim 1, wherein the processor generates the third video image data by combining a frame constituting the first video image data and a frame constituting the second video image data.

6. The imaging device according to claim 5, wherein the processor generates the third video image data by combining the frame constituting the first video image data and the frame constituting the second video image data side by side.

7. The imaging device according to claim 5, wherein the processor generates the third video image data by superimposing and combining the frame constituting the first video image data and the frame constituting the second video image data.

8. The imaging device according to claim 5, wherein the processor generates the third video image data by combining a part of the frame constituting the first video image data and a part of the frame constituting the second video image data.

9. The imaging device according to claim 1, further comprising:
a display unit that displays display data under control of the processor, wherein the processor compares the first setting condition with the second setting condition and displays a comparison result on the display unit.

10. The imaging device according to claim 9, wherein the processor compares the first setting condition with the second setting condition and displays the difference between the first setting condition and the second setting condition on the display unit as the comparison result.

11. The imaging device according to claim 1, wherein the processor generates the third video image data after generating the first video image data and the second video image data.

12. The imaging device according to claim 1, wherein the connection unit is wirelessly connected to the external device.

13. An imaging device comprising:
a connection unit that is connectable to an external device; and
a processor configured to perform:
processing of generating first video image data from captured video image data on the basis of a first setting condition;
processing of generating second video image data from the captured video image data on the basis of a second setting condition;
processing of generating third video image data indicating a difference between the first setting condition and the second setting condition on the basis of the first video image data and the second video image data; and
processing of outputting the third video image data to the external device via the connection unit,
wherein the processor outputs the first video image data instead of the third video image data in a case where a signal of a recording start instruction for the external device is received via the connection unit.

14. The imaging device according to claim 13, wherein the processor generates the third video image data by alternately arranging a frame constituting the first video image data and a frame constituting the second video image data.

15. The imaging device according to claim 13, wherein the processor generates the third video image data by alternately arranging a plurality of frames constituting the first video image data and a plurality of frames constituting the second video image data.

16. The imaging device according to claim 13, wherein the processor generates the third video image data by combining a frame constituting the first video image data and a frame constituting the second video image data.

17. An imaging method using an imaging device that includes a connection unit, which is connectable to an external device, and a processor, the imaging method comprising:
generating, by the processor, first video image data from captured video image data on the basis of a first setting condition;
generating, by the processor, second video image data from the captured video image data on the basis of a second setting condition;
generating, by the processor, third video image data indicating a difference between the first setting condition and the second setting condition on the basis of the first video image data and the second video image data; and
outputting, by the processor, the third video image data to the external device via the connection unit,
wherein the first setting condition is a condition set in the imaging device, and the second setting condition is a condition set in the external device.

18. An imaging method using an imaging device that includes a connection unit, which is connectable to an external device, and a processor, the imaging method comprising:
generating, by the processor, first video image data from captured video image data on the basis of a first setting condition;
generating, by the processor, second video image data from the captured video image data on the basis of a second setting condition;
generating, by the processor, third video image data indicating a difference between the first setting condition and the second setting condition on the basis of the first video image data and the second video image data; and
outputting, by the processor, the third video image data to the external device via the connection unit,
wherein, in a case where a signal of a recording start instruction for the external device is received via the connection unit, the first video image data is output by the processor, instead of the third video image data.

19. A non-transitory, computer-readable tangible recording medium having a program for causing, when read by a computer, the computer to execute the imaging method according to claim 17 recorded thereon.

20. A non-transitory, computer-readable tangible recording medium having a program for causing, when read by a computer, the computer to execute the imaging method according to claim 18 recorded thereon.

* * * * *